Patented Nov. 19, 1935

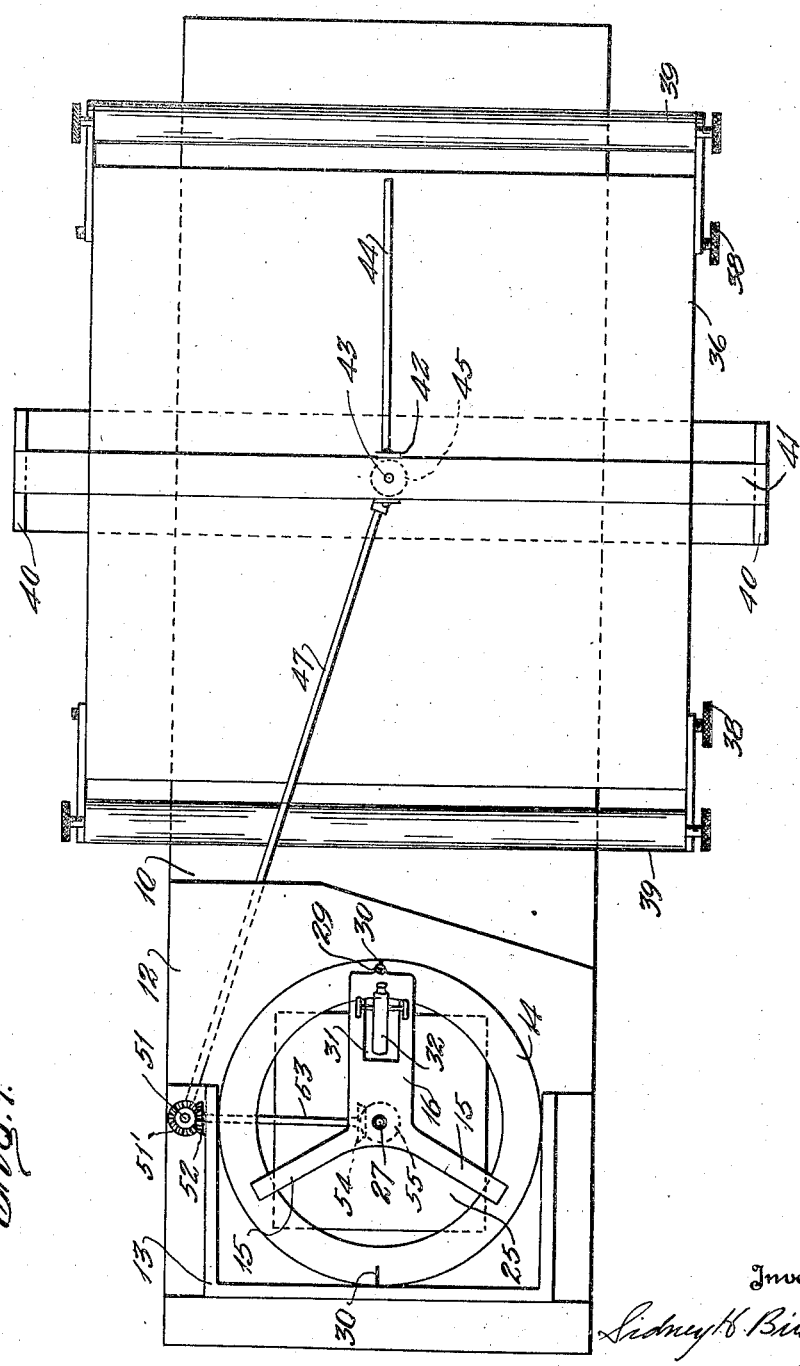

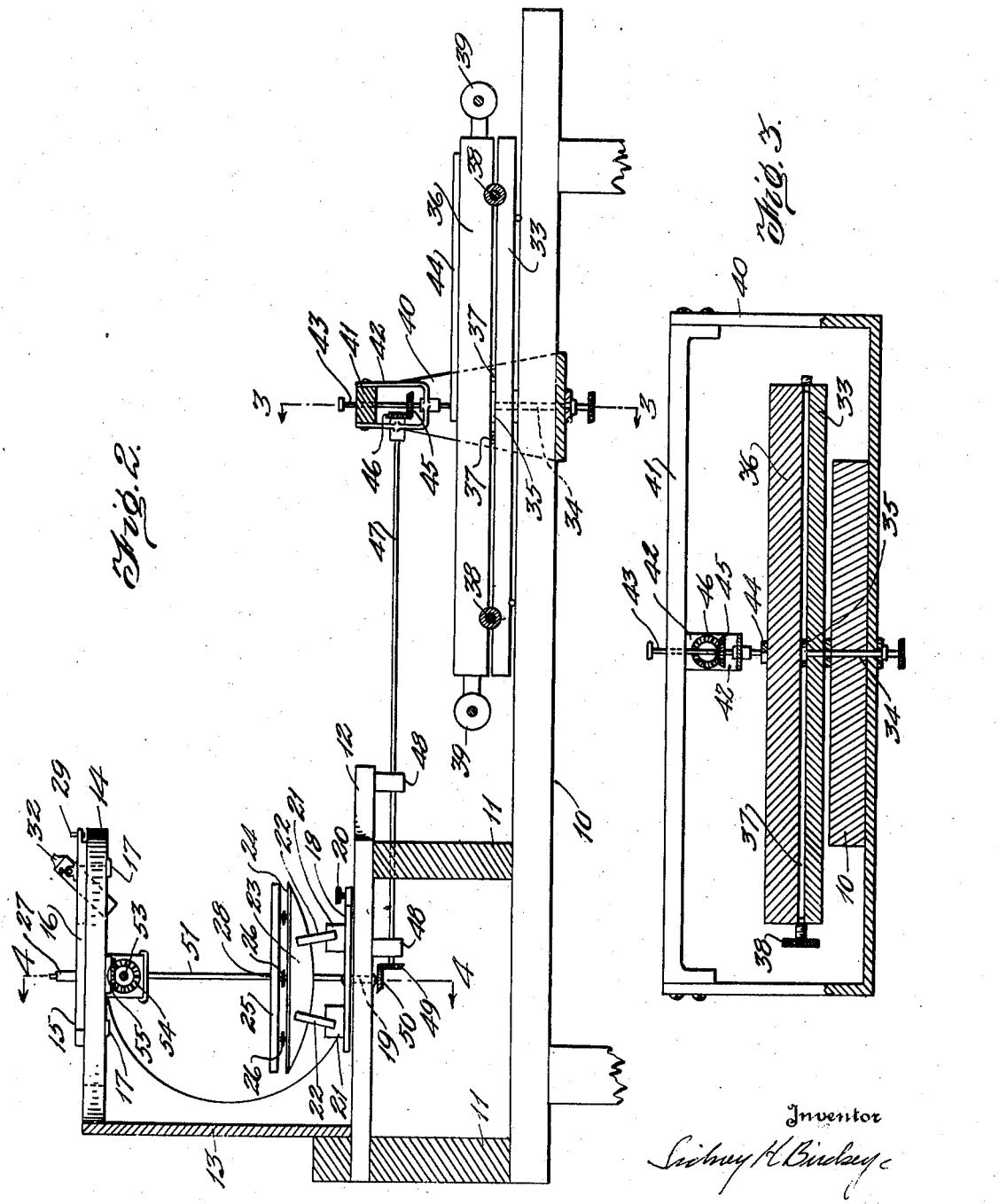

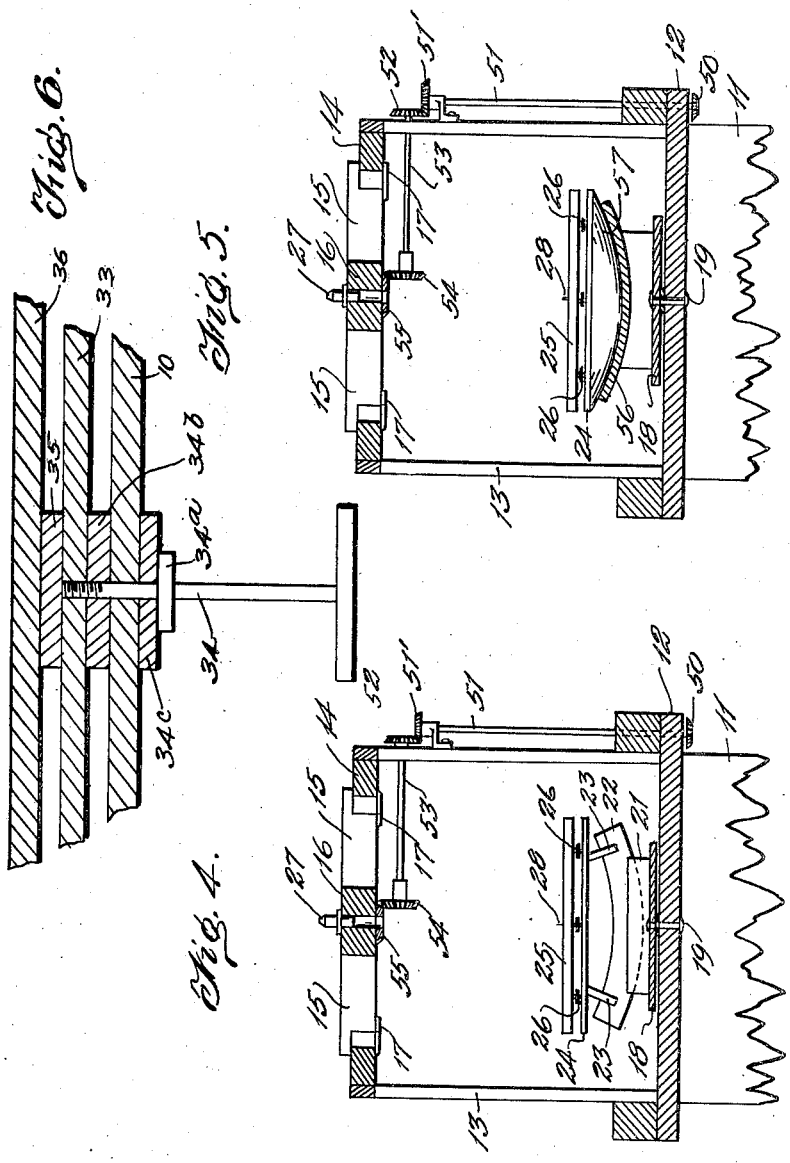

2,021,140

UNITED STATES PATENT OFFICE 2,021,140

METHOD AND APPARATUS FOR PLOTTING MAPS FROM AERIAL PHOTOGRAPHS

Sidney H. Birdseye, Washington, D. C.

Application March 30, 1932, Serial No. 602,067

10 Claims. (Cl. 33—1)

This invention relates to cartography and has special reference to the plotting of maps from aerial photographs, either vertical or oblique. In the following description the term vertical photograph is applied to one taken with the optical axis of the camera lens in approximately a vertical position and the term oblique photograph to one taken with the optical axis of the camera lens at an appreciable angle to the vertical.

In the preparation of maps from vertical aerial photographs certain difficulties exist. In the first place it is found in practice to be impossible to maintain an airship in a horizontal position while in flight and, in fact, it is only under very rare conditions of the air that an airship can be held, even momentarily, in fixed relation to a horizontal plane. It is thus not possible, if a camera be fixedly mounted on an airship, to cause the focal plane of the camera to retain a horizontal position because, due to operating conditions, it is practically impossible to ascertain whether or not the airship is, even momentarily, in an exact horizontal position.

It is also impossible by means of any practical measuring devices to ascertain the relation of the focal plane of the camera to the horizontal at any given instant. Even if the camera be movably mounted on the airship and controlled in its mount by means of a gyroscope or by hand with the aid of spirit levels, operating conditions make it impossible in practice to keep the focal plane of the camera in a horizontal position. Consequently, when the exposure is made the angular relation of the focal plane of the camera to the horizontal is an unknown quantity and the focal plane is truly horizontal only in very rare instances. The great majority of so called vertical aerial photographs are thus taken at an angle to the horizontal and in no case is that angle known at the instant of exposure. The consequence is that the photograph showing the terrain in perspective is distorted as the scale between image points is enlarged in one direction and decreased in the opposite direction from a certain line in the photograph called the axis of tilt or the no scale change line. Photographic images lying in this line have suffered no change in position or scale due to the tilted position. In the plane of a tilted photograph of absolutely level terrain the only lines of true direction to image points are those drawn from the so-called isocentre ("$m$") point, which is located at the intersection of the principal line of the photograph and the so-called axis of tilt line of the photograph.

Furthermore, there enters into the problem the factor of relief in the terrain, an elevated object or portion of the terrain appearing farther from the optical center of the photograph than its true distance and a depression appearing closer to such optical center. In the plane of a truly vertical photograph the only lines of true direction to images of elevated or depressed points are those drawn from the nadir point of the photograph. In photographs having both tilt and relief in the terrain, there is no point in the photograph from which lines of true directions to image points can be drawn in the plane of the photograph, or on a plane parallel thereto.

Due to the existance of these difficulties it has hitherto been impossible to plot true orthographic representations of the terrain from either so called vertical or oblique aerial photographs except by a stereoscopic method employing expensive stereoscopic instruments of high precision, by intricate and laborious mathematical computations, or by correcting and re-projecting the photograph to a truly horizontal photograph. It is, however, possible, as is shown in this invention, to remove the scale displacements of image points, due to tilt alone, by placing an aerial photograph in a plane corresponding to the position of tilt from the horizontal which existed in the negative plane of the camera at the instant of exposure, and to view the photograph through a suitable sighting device mounted above the photograph in a horizontal viewing plane. The principles involved in the tilted photograph plane and in the mounting of the sighting device are, in part, the actual reconstruction of conditions existing in the aerial camera at the instant of exposure. The recovery of the original position of tilt in the photograph is by trial methods and is based on certain principles of true radial directions. The distance between the optical center of the mounted photograph and the viewing plane is optional; but if properly placed at a distance equal to twice the focal length of the aerial camera lens it would contain the horizontal projection of the properly placed tilted photograph in the same photographic scale. A plane properly placed in this position is known to the art as the ideal plane. Nevertheless any properly placed plane parallel to this horizontal ideal plane will contain a horizontal projection of the tilted photograph, though at a different photographic scale. As this invention is concerned with radial directions only, photographic scale has no importance and certain distances can be fixed in the apparatus for economy and convenience.

One important object of the invention is to provide an improved method of and apparatus for graphically plotting on a map sheet, to any given map scale, the true horizontal position of any or all photographic image points in a series of overlapping aerial photographs taken with either a single or multiple lens camera of any focal length, by the graphic intersection on a map sheet of true direction radial lines drawn from the map position of the nadir points of each successive photograph to image points of common objects and, in this manner, to produce a continuous map plot throughout the entire photographic strip, showing the true horizontal positions of the intersected photographic image points to the selected map scale.

A second important object is to provide an apparatus for the mechanical adaptation of the ideal plane theory to graphic radial line plotting of maps by viewing the photograph, with a low powered telescope from a horizontal plane and determining in this horizontal plane the true horizontal values of the photographic angles at the photographic nadir point between direction lines extending to different image points.

An important feature of the invention is to provide in such an apparatus for the circular motion of the viewing telescope, in the above mentioned horizontal plane, around a fixed point of rotation in order that the photograph may be viewed from any direction.

Another important feature of the invention is to provide a photograph holding board mounted on a suitable tilting device directly below the viewing plane in such a manner that, when the board is horizontal, its mechanical center point will be on the vertical axis passing through the fixed center of rotation of the viewing plane.

Another important feature of the invention is to provide a tilting device for the photograph holding board that will tilt, or rotate, in any direction around a fixed point and to mount the combination of the photograph holding board and tilting device in such a manner that the fixed point on which the device tilts is located at a fixed point on the vertical axis through the center of rotation of the viewing plane and so that the plane of the photograph board is always normal to the radius of its tilting motion.

Another important feature of the invention is to provide a mechanical means of raising or lowering the photograph holding board mounted on the tilting device in order to vary the radius of the board's tilting motion to accommodate varying focal length requirements and, in this manner, to produce motions of tilt in the photograph board similar to the tilting motion of the negative plane in a given aerial camera around its lens point.

Another important feature of the invention is to provide a pivotally mounted, two sectioned drawing board for use herein held in a plane parallel to the viewing plane and to provide for a sliding side adjustment in the top section of the drawing board which carries the pair of paper rolls in order that the drawing board may be positioned and oriented with the photograph.

Another important feature of the invention is to provide a rotating protractor arm, laying on the surface of the drawing board, with one end of the arm firmly held at a fixed center of rotation directly above the pivot point of the drawing board and to mechanically connect, by a system of rods and gears, the rotating movement of the viewing telescope with the rotating protractor arm in order that a direction may be traced on the drawing board exactly parallel to the vertical plane containing the line of sight of the viewing telescope.

Another important feature of the invention is to provide, by means of paper rolls mounted at each end of the before mentioned drawing board, a method for the continuous plotting of the true horizontal positions of selected photographic image points throughout a strip of aerial photographs by the regulated movement of the drawing paper across the drawing board.

With the above and other objects in view as will be hereinafter apparent, the invention consists in general of certain novel details of construction and combinations of parts hereinafter fully described, illustrated in the accompanying drawings and specifically claimed.

The invention further consists in a certain novel method also fully explained hereinafter and specifically claimed.

In the accompanying drawings like characters of reference indicate like parts in the several views, and:

Figure 1 is a plan view of an apparatus embodying this invention.

Figure 2 is a side view partly in elevation and partly in section of the apparatus.

Figure 3 is a section on the line 3—3 of Figure 2.

Figure 4 is a section on the line 4—4 of Figure 2.

Figure 5 is a detail section showing a modified supporting device for the photograph holding board or table used herewith.

Figure 6 is an enlarged view of the clamping means shown in Figure 3.

In the embodiment of the invention as herein disclosed there is provided a base 10 at one end of which is mounted a pair of cross members 11 which support a platform 12 parallel to the base 10. Above this platform extends a bracket 13 of general U-shape in plan and in the upper end of this bracket is supported a ring 14 which is preferably termed the viewing circle. Revolubly mounted in this circle is a three armed spider having a pair of like arms 15 and a third, somewhat different arm 16. This spider is held to revolve in the ring by suitable means such as the clips 17. The axes of the arms 15 and 16 meet at the center of the ring 14 and the spider, in effect, rotates on this point as a center.

Mounted on the platform 12 is a turntable 18 which is provided with a shaft 19 fitted in the platform and in exact vertical alignment below the center of the ring 14. The turntable 18 may be controlled by a slow motion device indicated in general at 20 but the details of which are not deemed necessary here to be shown as the specific form of this device constitutes no part of the present invention and such devices are common in many arts, as in surveying instruments. Mounted on the turntable is a pair of parallel guides 21 each having a slot therein provided with a bottom curved longitudinally from end to end and the centers of these curves lie in a common point corresponding to the camera lens point and accordingly so termed. In this slot are slidably fitted the rockers 22 which are likewise slotted, the slots in one rocker being opposite the slots in the other rocker. For purposes of convenience these rockers will be termed the lower rockers. In the slots of the lower rockers are fitted the upper rockers 23 which are thus at right angles to the rockers 22. The arcuate under surfaces or edges of the rockers 23 are concentric to the camera lens point like the rockers 22. The under rockers thus afford a swinging motion about said lens point in one direction while the upper rockers permit swinging about said point in a direction at right angles thereto. It is to be noted that the camera lens point lies in the vertical line of the center of the ring 14 and the axis of the shaft 19.

A table 24 is fixed to the upper edges of the rockers 23 and a photograph holding board 25 is mounted on said table by suitable means, here shown as adjusting screws 26 to permit its adjustment toward and from the camera lens point and thus to suit various focal lengths, the distance from the camera lens point to the board being made equal, by adjustment, to the focal length of the camera used. By the means just described the photograph holding board may be tilted in any direction about the camera lens point of this instrument and will always be maintained in a normal position to its radius of tilt horizontal.

Mounted on the spider at its center of rotation is a vertical short range telescope 27 focused on the center point of the board 25 and having its optical axis coincident with the vertical axis through shaft 19 and the center of the ring 14. By placing a suitable marker, as a needle 28, at the mechanical center point of the board 25 and bringing this needle into the optical axis of the telescope 27 the board 25 may be set in its horizontal position. On the end of the arm 16 is fixed a vertical microscope 29 by which the axis of the arm 16 may be set to one or the other of a pair of index lines 30 located on the ring 14 at 180° apart. The arm 16 is provided with a slot 31 and pivotally mounted to swing through this slot is a telescope 32 having adjustable focus. This telescope is so mounted that its optical axis lies at all times in a plane passing through the line of axis of the shaft 19 and center of the ring 14. Thus the telescope always rocks in a plane radial to said line.

Mounted on the base 10 adjacent its remaining end is a platform 33 rotatable on a screw shaft 34 and adapted to be fixed in position by a clamp plate 35 carried by the shaft 34. The upper end of shaft 34 is threaded to engage female threads in clamp plate 35 which is fixed to platform 33. A flange 34a is formed on shaft 34 or fixed thereto below metal plate 34c, the latter plate being fixed to the under side of the base 10. A turn of the clamp wheel engages the threads of shaft 34 with plate 35 pressing the assembly against the flange 34a and thus fixing the board in position. Above this platform is a map supporting board 36 and this board 36 is guided to move transversely of the platform 33 by guides 37, adjusting screws 38 being used to effect this transverse movement. At each end of the board is a roller 39 for supporting a roll of drawing paper and for permitting movement of the paper longitudinally over the map board 36. At each side of the base 10 is a bracket 40 and these brackets are connected by a bridge piece 41 which runs across the board 36 in vertically spaced relation thereto. Carried by the bridge 41 is a bearing yoke 42 and journalled in the bridge and bearing yoke is a vertical shaft 43 which is in axial alignment with the shaft 34 and thus lies directly over the center of rotation of the board in any position of lateral shift.

On the lower end of the shaft 43 is fixed a straight edge 44 having its working edge radial to the axis of the shaft 43. Also on the shaft 43 is a miter gear 45 wherewith meshes a miter gear 46 carried on a shaft 47 supported in the yoke 42 and in suitable bearings 48 under the platform 12. This shaft 47 carries a miter gear 49 which meshes with a miter gear 50 on the lower end of a vertical shaft 51 supported on suitable bearings at one side of the bracket 13. On the upper end of the shaft 51 is a miter gear 51' which meshes with miter gear 52 which is carried on a shaft 53 suitably supported in the bracket 13 and carrying at its other end a miter gear 54 which meshes with a miter gear 55 fixed to the under side of the spider and having a central sight opening so as not to interfere with the line of vision through the telescope 27. These shafts and gears are so arranged that the vertical plane in which swings the optical axis of the telescope 32 and the working edge of the straight edge 44 are at all times parallel.

In the form of the device shown in Figure 5 the rockers are replaced by a segment-spherical bowl 56 wherein works a segmento-spherical male part 57 carrying the table 24. This bowl has its center of curvature at the camera lens point and thus the same effect as before may be produced.

In operation the vertical plane containing the horizontal (long) axis of the instrument and the vertical axis of the viewing circle 14 represents the vertical air base plane (i. e.—a vertical plane containing the lens points of two overlapping photographs). The photograph board 25 mounted on its tilting rockers represents the inverted negative plane of the aerial camera and the pivot point of the tilting motions of the rockers represents the aerial camera's lens point. The drawing board represents the horizontal ground datum plane and is the horizontal plane of the map. The viewing circle 14 represents a horizontal plane parallel to the ground datum and map planes located at some fixed distance in front of the camera lens. Directions in this horizontal plane of the viewing circle 14 are true directions in the map planes.

Tilt and topographic relief exist to a more or less degree in all aerial photographs and it is an accepted fact that photographic image displacements, due to topographic relief in the ground surface, radiate from the photographic nadir point. This fact, together with the known fact that radial directions to image points from the photographic optical center point (measured in the plane of the photograph) are distorted by tilt, are used to recover the original position of tilt existing in the camera's negative plane at exposure time.

In a truly vertical aerial photograph of the horizontal projection of a tilted one, the nadir point is the only point of radiation for image displacements due to topographic relief. In a tilted photograph there is no point of true radiation in the plane of the photograph for image displacements due to tilt and relief in the terrain, but if, in effect, all of the photographic images are projected to the horizontal viewing plane, the projected nadir point in this plane is the only point of true radiation for all remaining displacements of the projected images and is, therefore, the origin of true radial directions to image points. The measurement in the plane of the viewing circle 14 of the horizontal projections of the photographic radial angles at any other point will be distorted by image displacements due to topographic relief in the ground surface.

With the known horizontal position of at least four selected image points appearing in any given photograph plotted on the drawing board 36 and with the given photograph mounted on the photograph board 25 with its optical center point centered at the mechanical center of the board, it will be impossible to pass the traces of the radial direction rays, as determined by the viewing telescope 32 and transferred to the protractor arm 44, through the respective plotted map positions of these image points from any but the original tilted position of the photograph. Once the original position of tilt in the photograph is recovered, the true nadir plate point is automatically centered on the vertical axis of the viewing circle 14 and the map position of this nadir point is also automatically located at the fixed center (axis of shaft 43) on the drawing board 36. The traces of all image directions drawn on the drawing board 36 are true in direction and are not distorted by tilt or topographic relief displacements.

As in the known principles involved in the plane table three point and intersection methods, true directions from the known map positions of at least three objects permits the positive location of the map position of the observer; and vice versa, the intersection of true direction lines of sight from two known map positions to common objects positively locates the map positions of these objects. These principles are involved in all methods of radial line plotting. All previously devised graphic methods are based on the photographic angles received at the optical center point (principal point of the plate) and it is a known fact that all of these methods of graphic radial plotting are liable to excessive errors in scale and azimuth due to tilt in the negative plane of the camera and topographic relief in the ground surface. In my new device and improved method, directions are measured only from the nadir point of the photograph and all errors in map scale and azimuth due to tilt and topographic relief are eliminated.

In the use of this instrument in the improved method of graphic radial line plotting, the usual requirements of the photographic marking of the optical center point, 60% overlap between successive exposures in the line of flight and certain ground information are necessary. With the known horizontal position of four ground control points, whose images appear in the overlap area between a pair of photographs, the radial line plotting operations can be carried forward on this instrument, throughout a strip of overlapping aerial photographs, by mounting each photograph in turn on the photograph board 25, determining its original position of tilt from previously plotted map positions, orienting the photograph and the drawing board 44 to the air base line connecting the successive exposure stations and by the regulated movement of the map paper across the drawing board thus producing an accurate map plot. The improvement over existing graphic radial methods, which are usually done by hand, is in use of the photograph nadir point as the center for radial directions in the photograph and in the graphical measurement of the horizontal projections of the radial angles at the nadir point. In this manner errors in the direction lines due to tilt in the photograph and topographic relief in the ground surface are avoided.

As a practical example of operation, let it be supposed that at least three photographs have been exposed successively in the flight of an airship above the terrain to be mapped, each of the photographs overlapping the succeeding one approximately 60% so that the details of the terrain appearing in the second photograph also appear in either the first or the third photograph and furthermore so that the details in a narrow strip transversely across the center of the second photograph, due to the 60% overlap, also appear in both the first and third photographs. It is recognized generally that one principal use of aerial photography in map making is to eliminate a large amount of work necessary to fill in details by field work on the ground involving measurements, either directional or spatial or both, from and between known station points. It is therefore to be understood that four or more points on the terrain whose photographic images appear on the overlapping area of the first and second photographs have been previously located by any desired means so that their positions may be plotted on a map sheet in their relation to each other with the desired degree of accuracy and to the desired map scale.

The roll of paper for the map sheet is positioned on the rollers 39 over the drawing board 36 and the map positions of the known station points are carefully plotted, to the desired map scale, on the map sheet in true relation to each other and also in approximate relation to the center of the first photograph to be used. All photographs used for aerial mapping are provided with an optical center mark or with marginal registration to fix the center point, and the first photograph is now placed on the photograph holding board 25 with its optical center mark at the mechanical center of the board. The photograph holding board 25, having been adjusted for the proper focal length of the aerial camera, is now adjusted to an approximately horizontal position as the assumption is that careful flying and handling of the aerial camera has held the focal plane of the camera within a reasonable degree of tilt from the true horizontal position. A piece of tracing paper is now placed over the map sheet and pinned down and the identified photographic image of one of the predetermined ground station points is sighted through the tilting telescope 32, the spider being rotated for this purpose. A line is now drawn along the straight edge 44 on the tracing paper. This operation is repeated with each of the other predetermined ground station points whose images appear on the photograph in use. There will now be a series of four or more lines on the tracing paper radiating from the same point. The tracing paper is now freed and moved around on the map sheet to cause four or more of these direction lines to pass through the plotted map positions of their proper station points. If the tracing paper pattern of direction lines can be positioned on the map sheet so that each and all of its direction lines will perfectly intersect (or pass through) the plotted map positions of their proper station points it is immediately proven that the original tilted position of the photograph has been definitely recovered. It naturally follows, due to the construction of the instrument, that the photographic nadir point is automatically located on the optical axis of the vertical telescope 27, which is also the axis of the shaft 19 on which the turntable revolves. Moreover, the intersection of the radial direction lines on the tracing paper pattern automatically locates the map position of the photographic nadir point. This point is pricked through to the map sheet and the tracing paper pattern is discarded. The pricked point on the map sheet is suitably marked with pencil for easy identification and the drawing board 36 is now shifted laterally by means of adjustment screws 38 and the map sheet moved longitudinally by means of the paper rolls 39 until the marked map position of the nadir point has been brought to the center of rotation of the straight edge 44. The telescope 32 is now revolved and sighted at the image of one of the ground station points and the drawing board platform 33 is revolved on its pivot point until the map position of the sighted station point is lined up on the straight edge 44. The photographic images of the other ground station points are again sighted in turn and the proof of the recovery of the original position of tilt in the photograph, the proper adjustment of the tracing paper pattern and the correct orientation of the drawing board to the photograph is afforded by the perfect intersection of all radial direction lines with the map positions of their proper ground station points. With the above conditions fulfilled, all radial direction lines from the true nadir point to other photographic image points, as sighted by the telescope 32 and drawn along the straight edge 44 on the map sheet are absolutely true in direction and are unaffected by tilt or relief errors.

In practice it will generally be found on first trial that not more than two or possibly three radial direction lines can be caused to pass through the map positions of their respective station points. This fact affords immediate proof that the original position of tilt in the photograph has not been recovered.

The photograph board is now tilted in the direction and to the extent deemed proper by the operator to bring the board to the same angle to the horizontal as existed in the focal plane of the camera at the same of exposure. Experience enables the direction and extent of tilt to be closely approximated. Fresh tracing paper is now taken and the procedure repeated as many times as necessary until it is found that with the intersection of the lines on the tracing paper at the map position of the true nadir point all lines will pass through the plotted map positions of their respective station points. The operator is then assured that the plane of the photographs now bears the same relation to the map plane or horizontal plane of the instrument that the plane of the photographic plate bore to the horizontal at the instant of exposure. All points in the overlap area of this photograph which it is desired to locate are now successively observed through the tilting telescope and corresponding directional lines are drawn on the map along the straight edge. The same operations are now repeated for the second photograph as the images of the predetermined ground station points also appear in this photograph. Suppose a point as A other than one of the predetermined station points and which it is desired to locate on the map. A line has been drawn radiating from the position of the first true nadir point on the map in such direction that it will pass through this point. The point A is thus located somewhere on this line. A second line has been drawn from the position of the second true nadir point on the map also having this point somewhere on it. The point A therefore lies at the intersection of these two lines. Similarly, the other desired points are located.

In order to extend the plotting operations to the third photograph selected image points laying in the narrow transverse area of the second photograph which is overlapped by both the first and third photographs are sighted and their map positions are located by the intersection of the radial direction lines drawn from the map positions of the true nadir points of the first and second photographs. These intersected map positions of photographic image points appearing in the third photograph afford definite data with which the original tilted position of the third photograph can be recovered and, as in the case of the first and second photographs, the photographic and map positions of its true nadir point. It can readily be seen that, in this manner, accurate radial line plotting operations can be extended forward from photograph to photograph throughout the entire photographic strip.

The radial line plotting of adjacent and overlapping photographic strips can be accomplished on the same map sheet by using additional control points at the ends of these adjoining strips, or by using the position of points, in the overlap section of two strips, which were determined from the previously plotted strip. In this manner a complete map can be constructed on a single sheet, the only limits being the scale and size of the map.

It is well known that aerial photographs have been used in plotting maps. These plotting operations may be classified under three general heads,—(a) stereoscopic plotting methods; (b) plotting with corrected and re-projected photographs; (c) plotting with uncorrected photographs used singly. This invention is not concerned with method (a), but the methods (b) and (c) are of interest. An apparatus necessary for obtaining corrected and re-projected photographs and a method of map plotting with these are shown in the patent to A. Brock Jr. et al.—No. 1,585,413. This method uses corrected and re-projected photographs exclusively and involves the determination by ground survey methods of at least three elevations of points appearing in each photograph. The comparison of parallax values is the basis for the correction of the tilted photograph. A method of map plotting with uncorrected photographs used singly is described in "Topography and Surveying", Training Regulations #190–27, War Department, January 23, 1925 and also in U. S. Geological Survey Bulletin #788–F, in both of which attention is called to the many errors made in plotting due to tilt in the photograph and relief in the terrain. In these latter methods and other similar ones, no attempt is made to position the photograph, as has been described in this invention, in order to overcome plotting errors and furthermore, in these methods all radial directions are measured in or on the plane of the uncorrected photograph.

In the present instance, the method and apparatus requires no ground elevations and employs the original aerial negative or contact prints made directly therefrom. For the purpose of distinguishing such negatives or contact prints from corrected and re-projected negatives or photographs, they will be referred to in the claims as uncorrected negatives or photographs.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an apparatus for plotting maps from aerial photographs, a horizontal plane-determining means rotatable about an axis normal to its plane, photograph supporting means below said determining means and mounted for universal pivotal movement about a center lying in the horizontal plane of the determining means, sighting means carried by said plane determining means and determining a plane containing the axis of rotation of the determining means, a sheet support, straight edge means mounted for pivotal movement over said sheet support, and means interconnecting said straight edge means and plane determining means for maintaining the straight edge means in fixed relation to the plane determined by said sighting means.

2. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane-determining means, sighting means carried by said plane determining means and determining a plane containing the axis of rotation of the determining means, a sheet support, a straight edge mounted for pivotal movement over said sheet support, and means interconnecting said straight edge and plane-determining means for maintaining the straight edge in parallel relation to the plane determined by the sighting means.

3. In an apparatus for plotting maps from aerial photographs, a horizontal plane-determining means rotatable about an axis normal to its plane, a photograph supporting board below said determining means, universal joint means supporting the said board for universal pivotal movement about the intersection of said axis with the horizontal plane determined by said plane-determining means, the means supporting the board including means to adjust the board angularly in a vertical direction independent of its pivotal movement, sighting means carried by said plane-determining means and determining a plane containing the axis of rotation of the determining means, a sheet support, a straight edge mounted for pivotal movement over said sheet support, and means interconnecting said straight edge and plane determining means for maintaining the straight edge in parallel relation to the plane determined by the sighting means.

4. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane-determining means, sighting means carried by said plane determining means and determining a plane containing the axis of rotation of the determining means, said sighting means being pivoted to the plane determining means while maintaining the line of sight in the plane containing the said axis of rotation of the plane determining means, a sheet support, a straight edge mounted for pivotal movement over said sheet support, and means interconnecting said straight edge and plane determining means for maintaining the straight edge in parallel relation to the plane determined by the sighting means.

5. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane determining means, sighting means carried by said plane determining means and determining a plane containing the axis of rotation of the determining means, said sighting means being pivoted to the plane determining means while maintaining the line of sight in the plane containing the said axis of rotation of the plane determining means, a second sighting means fixed to the plane determining means with its line of sight coincident to the axis of rotation of the plane determining means, a sheet support, a straight edge mounted for pivotal movement over said sheet support, and means interconnecting said straight edge and plane determining means for maintaining the straight edge in parallel relation to the plane determined by the sighting means.

6. In an apparatus for plotting maps from aerial photographs, a horizontal plane determining means rotatable about an axis normal to its plane, photograph supporting means below said determining means and mounted for universal pivotal movement about a center lying in the horizontal plane of the determining means, sighting means carried by said plane determining means and determining a plane containing the axis of rotation of the determining means, a sheet support, straight edge means mounted for pivotal movement over said sheet support, means interconnecting said straight edge means and plane determining means for maintaining the straight edge means in fixed angular relation to the plane determined by said sighting means, a platform pivoted co-axially with the straight edge, said support being mounted on said platform for movement transversely thereof, and paper receiving rolls at the ends of said sheet support.

7. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane determining means, sighting means carried by said plane determining means and determining a plane containing the axis of rotation of the determining means, said sighting means being pivoted to the plane determining means while maintaining the line of sight in the plane containing the axis of rotation of the plane determining means, a sheet support, a straight edge mounted for pivotal movement over said sheet support, means interconnecting said straight edge and plane determining means for maintaining the straight edge in parallel relation to the plane determined by the sighting means, a mount for said sheet support pivoted co-axially with the straight edge, means to move the sheet support transversely of its mount, and paper receiving rolls at the ends of said sheet support.

8. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane determining means, the means supporting the board including means to adjust the board angularly independent of its pivotal movement, sighting means carried by said plane determining means and determining a plane containing the axis of rotation of the determining means, said sighting means being pivoted to the plane determining means while maintaining the line of sight in the plane containing the axis of rotation of the plane determining means, a sheet support, a straight edge mounted for pivotal movement over said sheet support, means interconnecting said straight edge and plane determining means for maintaining the straight edge in parallel relation to the plane determined by the sighting means, a mount for said sheet support pivoted co-axially with the straight edge, means to move the sheet support transversely of its mount, and paper receiving rolls at the ends of said sheet support.

9. In an apparatus for plotting maps from aerial photographs, a horizontal plane-determining means rotatable about an axis normal to its plane, a photograph supporting board below said determining means, means supporting the said board for universal pivotal movement about the intersection of said axis with the horizontal plane determined by said plane determining means, sighting means carried by said plane determining means and determining a plane containing the axis of rotation of the determining means, said sighting means being pivoted to the plane determining means while maintaining the line of sight in the plane containing the said axis of rotation of the plane determining means, a sheet support, a straight edge mounted for pivotal movement over said sheet support, means interconnecting said straight edge and plane determining means for maintaining the straight edge in parallel relation to the plane determined by the sighting means, a mount for said sheet support pivoted co-axially with the straight edge, means to move the sheet support transversely of its mount, and paper receiving rolls at the ends of said sheet support.

10. The method of recovering the photographic nadir point in an uncorrected aerial photograph which consists of universally tilting the said photograph below a pivot point representing the lens point of an aerial camera in such a manner as to always maintain the plane of the photograph in a position normal to its radius of tilt and so that for each new position of tilt a new centrally located photographic image point designated hereinafter as the trial nadir point will be located on the vertical through the said pivot point, the measuring in a horizontal plane placed above the said pivot point of the horizontal projections of the angles between a number of radial direction lines radiating in the plane of the tilted photograph from the said trial nadir point on the vertical to three or more selected image points on the photograph, adjusting the said photograph in a number of trial positions of tilt from the horizontal and measuring for each trial position the angular value of the horizontal projections of each set of angles between radial direction lines adjacent each said trial nadir point to the said selected image points, comparing the angular values in each set of radial directions with the previously known and plotted map positions of the said selected image points, testing all lines in each set of radial directions for errors of intersection at their respective corresponding map positions by the method known in plane table surveying as "location by resection" which only permits a definite location of the instrument station to be made when all directions sighted are true directions and which is therefore based on the measurement of true angles between these directions, continuing the testing from said trial positions of tilt until a position of the photograph has been established from which the set of radial directions as projected from the plane of the photograph and measured in the said horizontal plane will perfectly intersect the map positions corresponding to the said selected image points, and marking on the surface of the photograph the true nadir point which is now located on the said vertical through the said pivot point.

SIDNEY H. BIRDSEYE.